United States Patent [19]
Holland et al.

[11] Patent Number: 5,463,598
[45] Date of Patent: Oct. 31, 1995

[54] MAN OVERBOARD ALERT AND LOCATING SYSTEM

[75] Inventors: Malcolm J. Holland, Stowe; Michael J. Rainey, Roxbury, both of Vt.

[73] Assignee: SafeSea Systems, Inc., Stowe, Vt.

[21] Appl. No.: 289,772

[22] Filed: Aug. 12, 1994

[51] Int. Cl.⁶ ..................................................... G01S 11/14
[52] U.S. Cl. ........................... 367/131; 367/910; 367/118
[58] Field of Search .................. 367/131, 89, 910, 367/6, 134, 118; 441/89; 340/573

[56] References Cited

U.S. PATENT DOCUMENTS 4,305,143  12/1981  Simms et al. ............................ 367/134
4,813,025  3/1989  Rowland et al. ............................ 367/6

*Primary Examiner*—Daniel T. Pihulic

[57] ABSTRACT

A system for automatically detecting the event of a person or object falling overboard from a vessel into water includes a portable ultrasonic transmitter worn by each person or attached to selected objects on board and designed to be activated upon immersion in water, and an alarm control unit carried by the vessel containing an ultrasonic receiver. When the receiver detects a signal produced by a portable transmitter, it sounds an alarm and displays the vector velocity of the vessel relative to the portable transmitter, allowing rescue operations to be initiated and carried out even in conditions of zero visibility.

8 Claims, 4 Drawing Sheets

MAN OVERBOARD ALERT AND LOCATING SYSTEM

FIELD OF THE INVENTION

This invention relates to a system for automatically detecting the event of a person or object falling overboard from a vessel into water and for providing both an alarm signal and a means for locating the person or object which has fallen overboard.

DESCRIPTION OF PRIOR ART

There is a need for an improved system for detecting and aiding in the rescue of a person who has fallen overboard from a water-born vessel. Various devices exist to automatically signal such an event. These devices all rely upon the transmission or interruption of radio frequency (RF) signals through the air or upon the transmission of acoustic signals through the water.

Systems which rely upon the interruption of RF signals from a portable transmitter attached to the body of an individual who has become immersed in water have three serious deficiencies:

a. Since it is the absence of a signal which causes the alarm, there is no way of locating the individual in need of rescue except by visual or audible means, a virtual impossibility at night, in bad weather, or in the case of the individual being unconscious, and b. The transmitter attached to the individual being monitored must transmit continuously, necessitating the use of large and cumbersome batteries and/or requiring frequent battery replacement and causing an unacceptable number of false alarms, and c. When multiple individuals are being monitored, each transmitter must produce a unique signal, requiring an excessively complex receiver and guaranteeing that there will be some absolute upper limit to the number of individuals that can be monitored by the system.

Systems which rely upon the transmission of RF signals from a transmitter attached to the individual who has fallen into the water require that an antenna for that transmitter be deployed on or above the water. The problem with such a system is that the presence of water between the transmitting antenna and the receiving antenna may render it inoperative. Unfortunately, the conditions most likely to cause submersion in or blockage by water of the transmitting antenna are exactly the conditions in which a man overboard situation is most likely to occur, e.g. high winds and large seas.

Finally, systems which employ acoustic signals produced by a transmitter attached to a person who has fallen overboard have heretofore suffered from one common and serious disadvantage: they all fail to take proper account of the problems caused by natural and man-made acoustic noise present in any large body of water and exacerbated by the presence of a motor-driven vessel. These problems are so pervasive and unpredictable that they may render any such previously disclosed system inoperable.

Furthermore, only one previously disclosed ultrasonic overboard detection system, shown in U.S. Pat. No. 4,813,025 of Rowland et al, provides any means of locating the individual who has fallen overboard. This complicated and cumbersome system utilizes both ultrasonic and RF signals to continuously monitor a limited and finite number of remote units and consequently suffers from all the previously mentioned disadvantages. In addition, to determine the location of the individual who has fallen overboard, this system requires a minimum of three ultrasonic transducers mounted in a phased array on the hull of the vessel.

SUMMARY OF THE INVENTION

The present invention avoids and overcomes these and other problems by providing for an automatic signalling, sensing, and locating system and method which is activated when a person falls overboard from a vessel into water and which comprises:

an inexpensive and unobtrusive portable acoustic transmitter which produces ultrasonic waves at a known and stable frequency upon immersion in water and which is intended to be worn on the lower extremity or outer clothing of a person, a single ultrasonic hydrophone mounted on or through the hull of a vessel and designed to receive the signal produced by the aforementioned transmitter, an alarm control unit connected to the hydrophone and containing a very narrow bandwidth receiver for detecting and subsequently tracking a Doppler-shifted signal originating from the portable acoustic transmitter and producing both an audible alarm and a visual indication of the velocity of the vessel relative to the individual carrying the portable transmitter.

In addition to the foregoing, the system provides a means which may be used to automatically shut off vessel power, alter vessel course, or eject flotation equipment when an alarm condition occurs. Said means may also be used to activate a device which obtains the vessel's location at the instant that the alarm condition occurs by interrogating radio or satellite navigation equipment carried aboard the vessel and which stores and displays that information. This particular feature may prove useful in situations where the vessel, because of its operating characteristics or because of circumstances including weather and other emergencies, is unable to respond to the man overboard event in a timely fashion.

In one preferred embodiment of the invention, a small ankle, belt, or vest mounted portable acoustic transmitter is activated when water bridges two electrical contacts mounted on the transmitter case. The transmitter is powered by a small battery and consumes less than 1 microampere when out of water, providing a battery life which approaches shelf life. When activated, the transmitter consumes 100 milliwatts of power, providing for a battery life in excess of 1 hour. The signal produced by the transmitter has a strength of 150 db reference 1 micropascal at one meter and is omni-directional in nature. The frequency of this signal is stable and predictable due to the use of a standard 32,768 Hz. quartz watch crystal.

The receiver aboard the vessel acquires the acoustic signal by way of a hull mounted hydrophone and compares the frequency of the received signal with a 32768 Hz. internal reference to determine the amount by which the received signal is Doppler shifted. If the received frequency is greater than the reference, the vessel has a vector velocity toward the man overboard. If the received frequency is less than the reference, the vessel has a vector velocity away from the man overboard. The difference between the two frequencies is trigonometrically proportional to the magnitude of the vector velocity of the vessel relative to the man overboard. The receiver displays this velocity in knots on an illuminated red or green bar graph, with red indicating velocity away from the man overboard and green indicating velocity toward the man overboard. If the vessel is steered so as to maximize the green bar graph display, the vessel will proceed directly toward the man overboard.

After initially acquiring a signal in the expected range of frequencies, the receiver immediately narrows its bandwidth to ±10 Hz. using a phase locked loop of variable loop filter cut off frequency to track the slowly changing Doppler shifted signal. If the signal persists for a pre-set minimum time, the receiver latches into alarm mode, activating the bar graph display and sounding a continuous audible alarm, and energizing a SPDT relay to control auxiliary devices.

By functioning in this manner, the receiver significantly and effectively reduces ambient acoustic sea noise, preventing false alarms and allowing an acceptable signal-to-noise ratio for the system even with the small and relatively low-powered transmitter described above.

In quiet ocean conditions, the effective range of the system is in excess of 1 kilometer. Increased acoustic noise, either natural or man made in origin, will act to reduce this range. However, when the man overboard situation first arises a strong signal will be produced due to the short range, assuring the detection of an alarm situation even in high noise conditions.

DRAWING FIGURES

DESCRIPTION OF INVENTION

Figure 1:
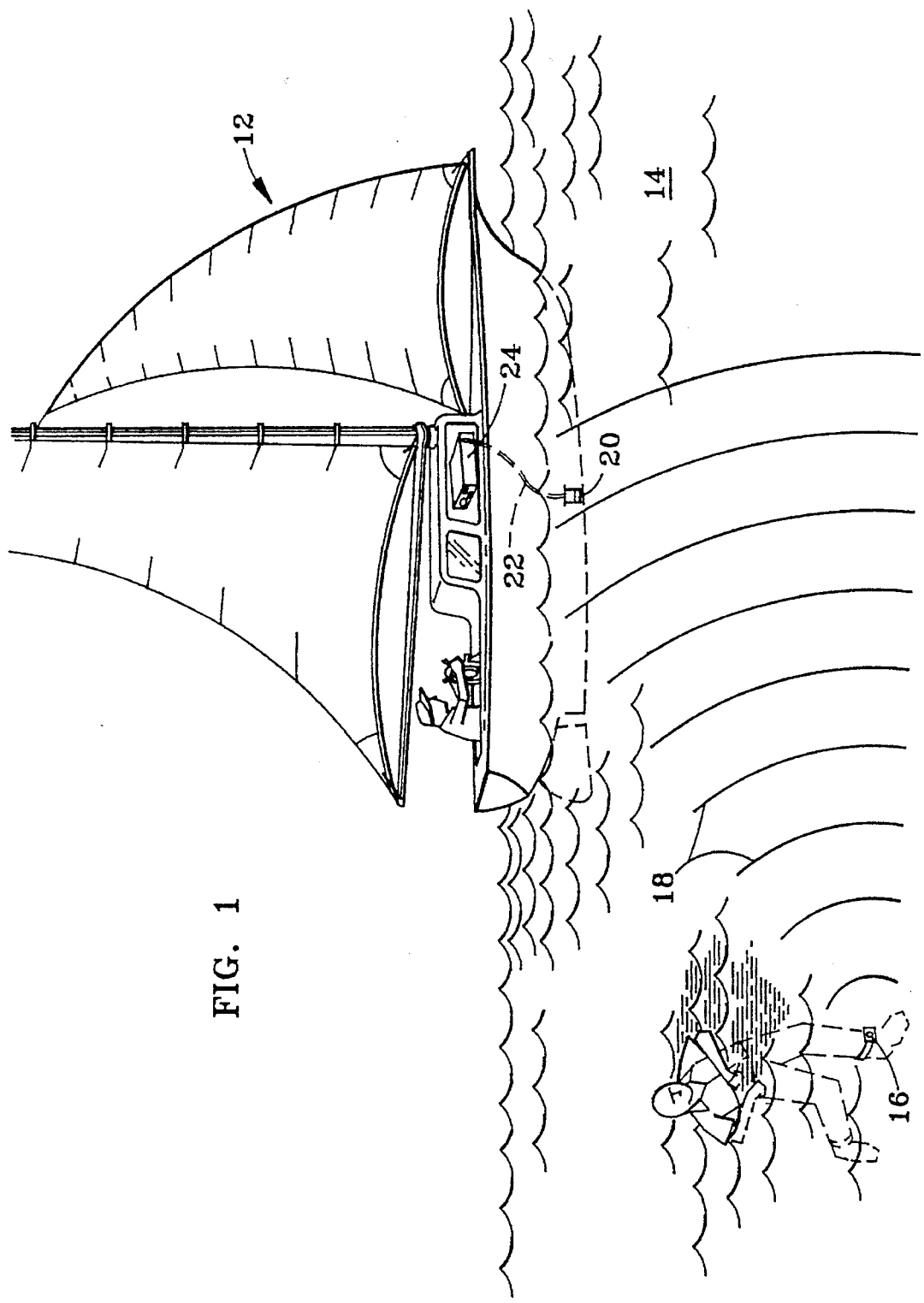
FIG. 1 is a view of the general setting in which the invention is needed.

In FIG. 1, a person 10 is shown as having fallen overboard from a vessel 12 into water 14. The person is shown as having a portable acoustic transmitter 16 which is attached to his ankle by means of a strap. As will be more fully explained, portable acoustic transmitter 16 transmits ultrasonic signals 18 through the water to a hull mounted ultrasonic hydrophone 20 which is connected by a shielded audio cable 22 to an alarm control unit 24 carried by the vessel.

Figure 2:
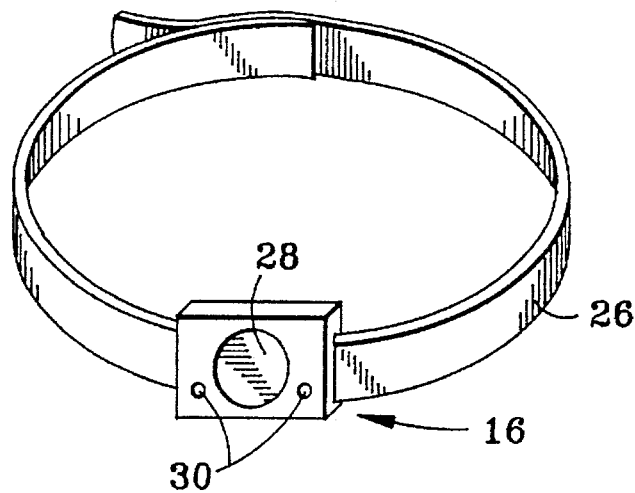
FIG. 2 is a perspective view of the portable acoustic transmitter and mounting means therefore.

As shown in FIG. 2, portable acoustic transmitter 16 is attached to an adjustable strap 26 which is capable of being fastened around the ankle of a person. A pair of exposed electrical contacts 30, when bridged by the electrical conductivity of water, provides the actuating means for the transmitter. When activated, transmitter 16 produces ultrasonic signals by means of a PZT piezoelectric acoustic emitter disk 28.

Figure 3:
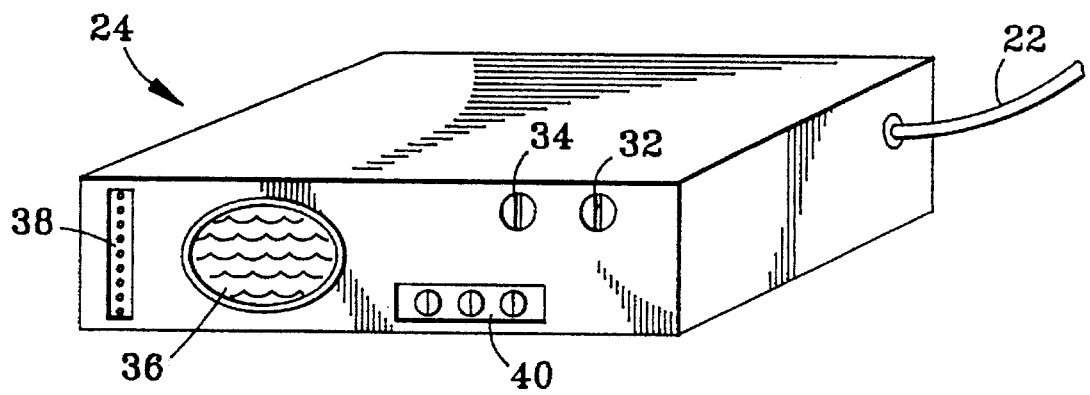
FIG. 3 is a perspective view of the alarm control unit.

FIG. 3 shows alarm control unit 24 intended for mounting in or on the bridge of a vessel. The unit contains an ultrasonic receiver which will be more fully explained and which is connected to hull mounted ultrasonic hydrophone 20 by means of shielded audio cable 22. The alarm control unit also contains a power switch 32, an alarm reset switch 34, a loudspeaker 36, a dual color LED bar graph display 38, and the load terminals 40 of a SPDT relay. When an alarm condition is detected, the SPDT relay and bar graph display 38 are energized and loudspeaker 36 produces a continuous audible tone. When energized, bar graph display 38 provides a visual indication of velocity made good (VMG) in knots by the vessel toward or away from the portable acoustic transmitter, with VMG away from the transmitter indicated by a red bar graph and VMG toward the transmitter indicated by a green bar graph.

Figure 4:
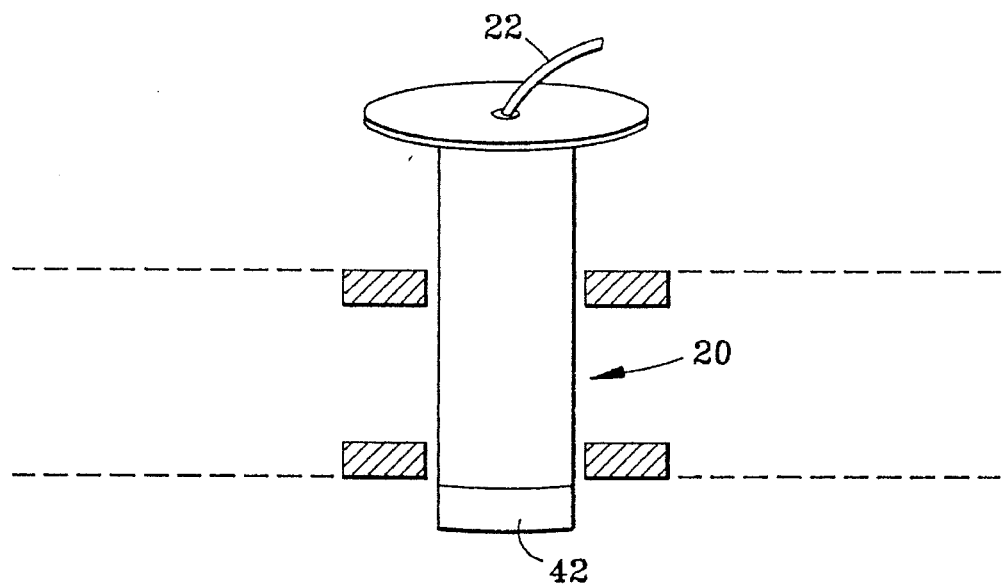
- FIG. 4 is a perspective view of the hull mounted ultrasonic hydrophone.

As shown in FIG. 4, hull mounted ultrasonic hydrophone 20 is cylindrical in shape so that it can be installed in a hole in the hull of a vessel below its water line, thereby exposing a cylindrical piezoelectric device 42 to the sea. Shielded audio cable 22 connects hydrophone 20 to the receiver of alarm control unit 24, both of which are shown in block diagram form in FIG. 6.

Figure 5:
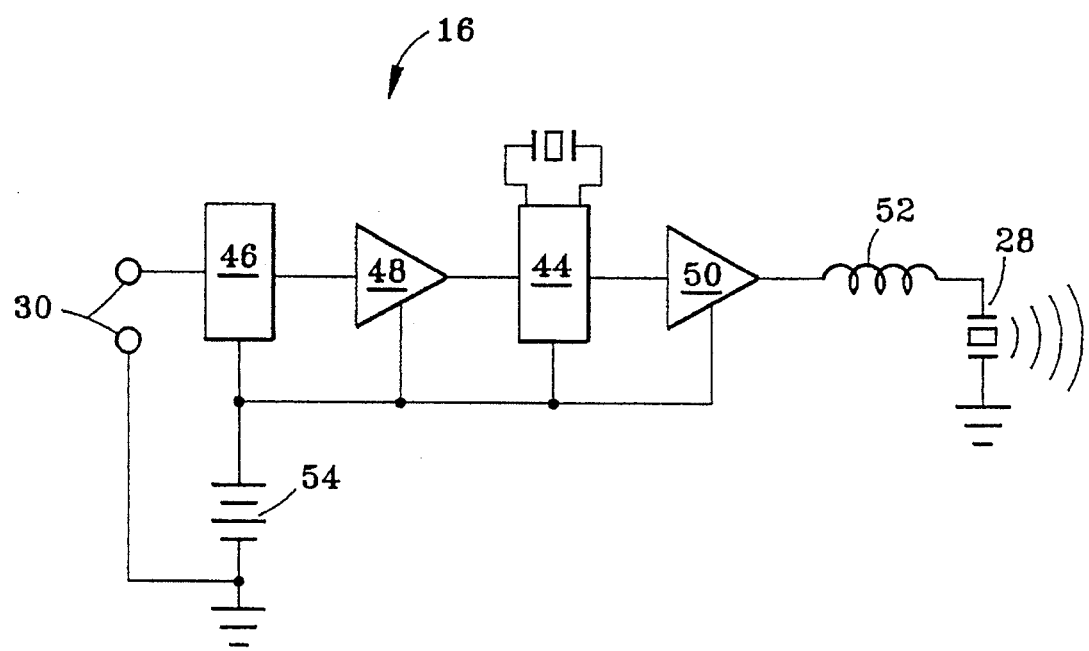
FIG. 5 is a block diagram of the portable acoustic transmitter.

FIG. 5 is a block diagram of portable acoustic transmitter 16. If water should bridge electrical contacts 30, a quartz crystal oscillator 44 is activated by way of a high input impedance switch 46 and logic invertor 48. The quartz crystal of oscillator 44 is a standard wristwatch tuning fork piezoelectric device with an accurately held frequency of 32768 Hz. Oscillator 44 provides a very low power signal to an amplifier 50. The amplified signal is delivered to PZT piezoelectric acoustic emitter disk 28 by way of a tuning coil 52. Acoustic emitter disk 28 resonates both electrically and mechanically at 32768 Hz. The diameter of acoustic emitter disk 28 is 25 millimeters, which is a compromise value chosen to maximize acoustic efficiency while maintaining omni-directionality of the acoustic signal. The circuitry of portable acoustic transmitter 16 is powered by a small battery 54. Current consumption in the off or dry state is ½ microampere which allows for a long standby battery life. Current consumption with the transmitter on or wet is approximately 100 milliwatts which gives an activated battery life of several hours. The emitted acoustic pressure level at one meter is approximately 150 db reference 1 micropascal.

Figure 6:
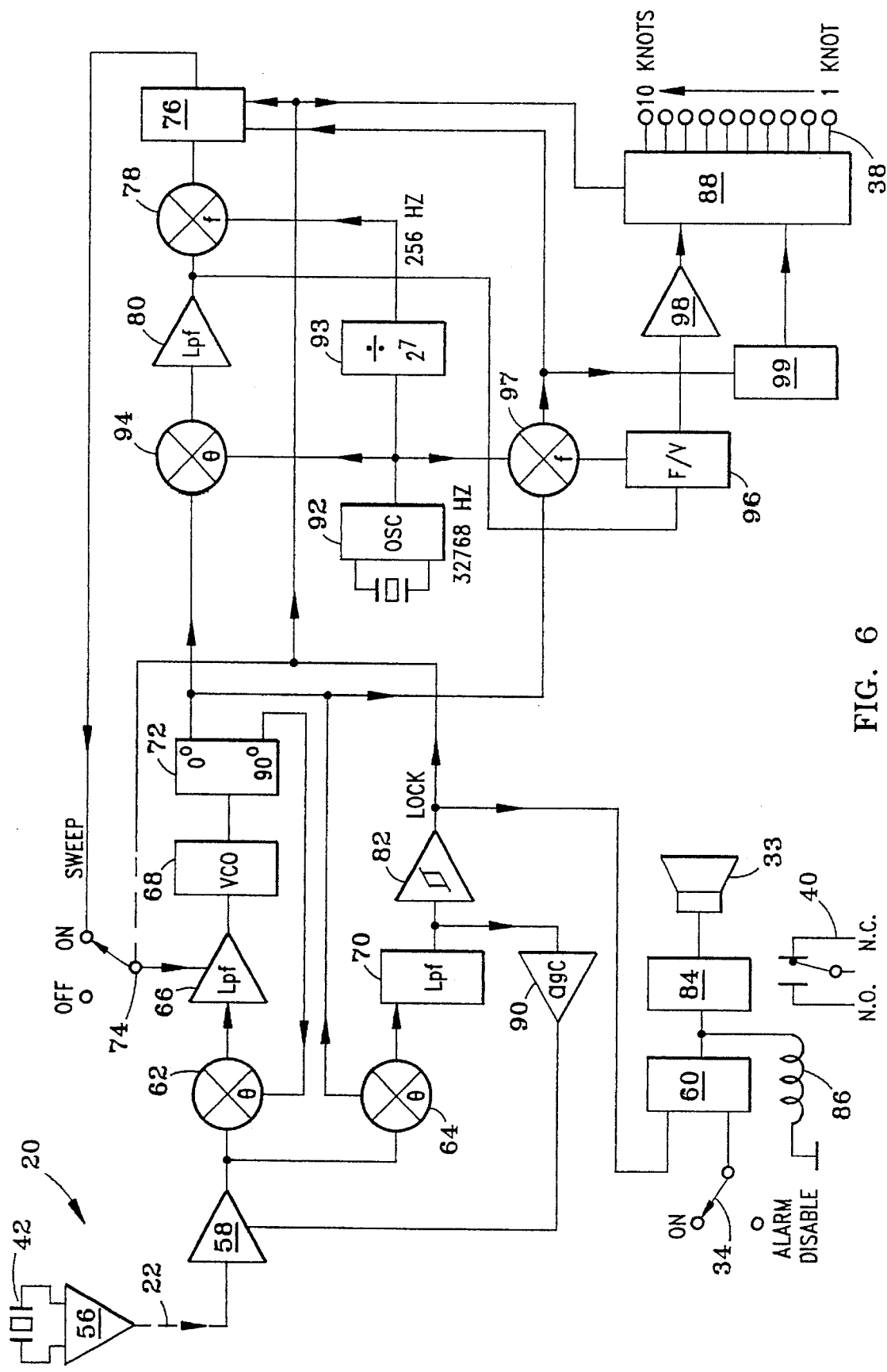
FIG. 6 is a block diagram of the alarm control unit and the hull mounted ultrasonic hydrophone.

FIG. 6 is a block diagram of hull mounted hydrophone 20 and alarm control unit 24. An acoustic signal is converted from a water transmitted pressure wave to an electrical signal by transducer 10 which is electrically and mechanically tuned to 32768 Hz., with an effective water loaded Q of 30. In the same hull mounted fixture is a low noise, high input impedance to low output impedance amplifier 56 which is connected to alarm control unit 24 by means of shielded audio cable 22.

A variable gain amplifier 58 provides the proper signal level to a pair of phase detectors 62 and 64. Phase detector 62, an active low pass filter 66, and a voltage controlled oscillator 68 comprise a phase locked loop tracking filter with a double sideband filter bandwidth of 20 Hz. This very narrow bandpass filter reduces the ambient water borne background noise to an acceptable level.

Phase detector 64, a passive low pass filter 70, and a phase shifter 72 form a synchronous detector. When the output of this synchronous detector is low, bar graph display 38, the SPDT relay, and an alarm tone generator 84 remain off. In this state the frequency of oscillator 68 is linearly swept between 32512 Hz. and 33024 Hz., at a rate of 85 Hz. per second. This frequency sweep is accomplished by injecting the proper polarity current through an active CMOS switch 74 into active low pass filter 66 which causes the voltage into oscillator 68 to ramp up and down. This frequency ramp polarity is controlled by a logic circuit 76. Logic circuit 76 has as its inputs signals from a frequency detector 78 and a frequency detector 97 which provide the magnitude and direction respectively of the swept frequency away from 32768 Hz. Frequency detector 97 had as its reference signal the output of a 32768 Hz. quartz crystal oscillator 92. Frequency detector 78 has as its reference signal the 256 Hz. output of a divider 93.

If a continuous acoustic signal of sufficient amplitude appears anywhere between the 32512 to 33024 Hz. sweep limits, it will cause a Schmitt trigger 82 output to go high as soon as oscillator 68 frequency coincides with the input signal frequency. Schmitt trigger 82 high output level causes switch 74 to operate and halt the frequency sweep. The phase locked loop consisting of phase detector 62, low pass filter 66, and oscillator 68 now locks onto and tracks the frequency of the incoming signal. Alarm tone generator 84 is activated by a triggered latch 60 causing loudspeaker 33 to produce an audible tone and to continue to do so until switch 34 is manually reset. In addition, an SPDT relay 86, and a LED bar graph driver 88 are activated. The detected signal available at the output of low pass filter 70 is fed through an AGC amplifier 90 back to variable gain amplifier 58. This forms an effective coherent automatic gain control of input signal amplitude.

A reconstruction of the incoming acoustic signal frequency is available at the output of phase shifter 72. This reconstructed signal frequency is compared with a reference signal produced by 32768 Hz. quartz crystal oscillator 92 by injecting both the signal and the reference into a phase detector 94 and eliminating the sum frequency in low pass filter 80. The output of low pass filter 80 is a signal of a frequency equal to the input acoustic signal Doppler frequency shift. This Doppler frequency equivalent signal drives a frequency to voltage convertor 96. A Doppler magnitude analog DC voltage equivalent signal is fed through an adjustable gain amplifier 98 and into LED bar graph driver 88. The number of LED segments of bar graph display 34 illuminated is directly proportional to the input acoustic signal Doppler frequency shift, which is itself a cosine function of the magnitude of the vector velocity of the receiver with respect to the transmitter.

The Doppler polarity is determined by comparing the reconstructed Doppler frequency signal from the output of phase shifter 72 with the 32768 Hz. reference signal of oscillator 92 by injecting both signals into frequency detector 97. If the input Doppler frequency is greater than 32768 Hz., frequency detector 97 output will be high. If the input Doppler frequency is less than 32768 Hz., frequency detector 97 output will be low. The output of frequency detector 97 is fed by way of logic circuit 99 to LED bar graph driver 88 where either green (converging vector velocity), or red (diverging vector velocity) LED's are selected.

Conclusion, Ramifications, and Scope of Invention

From the foregoing it can be seen that the alarm and locating device of the invention provides a highly reliable, unobtrusive, yet economical system which can be used aboard vessels of virtually any size or description.

While the above description contains many specificities, these should not be construed as limitations on the scope of the invention, but rather as an exemplification of one preferred embodiment thereof. Many other variations are possible. For example, the invention can be adapted to detect and locate objects such as cargo containers or gear which have broken loose and fallen from the deck of a vessel or towed auxiliary vessels which have become detached from the towing vessel. Accordingly, the scope of the invention should be determined not by the embodiment illustrated, but by the appended claims and their legal equivalents.

What is claimed is:

1. An automatic alert and locating system comprising:

a portable ultrasonic transmitter capable of transmitting an ultrasonic signal through water, an ultrasonic receiver adapted to be immersed in water and further adapted to sense the signal produced by said transmitter, and means coupled to said receiver for determining from the received signal the magnitude and direction of the velocity of said receiver with respect to said transmitter.

2. An automatic alert and locating system according to claim 1 wherein said transmitter is adapted to be worn by a human.

3. An automatic alert and locating system according to claim 1 wherein said transmitter is adapted to be attached to an item of deck cargo or equipment.

4. An automatic alert and locating system according to claim 1 wherein said transmitter is adapted to be attached to an auxiliary vessel or object being towed.

5. An automatic alert and locating system comprising:

an immersion-activated portable ultrasonic transmitter capable of transmitting an ultrasonic signal through water, an ultrasonic receiver adapted to be immersed in water and further adapted to sense the signal produced by said transmitter, and means coupled to said receiver for determining from the received signal the magnitude and direction of the velocity of said receiver with respect to said transmitter.

6. An automatic alert and locating system according to claim 5 wherein said transmitter is adapted to be worn by a human.

7. An automatic alert and locating system according to claim 5 wherein said transmitter is adapted to be attached to an item of deck cargo or equipment.

8. An automatic alert and locating system according to claim 5 wherein said transmitter is adapted to be attached to an auxiliary vessel or object being towed.

* * * * *